July 3, 1962 J. E. HOLLIDAY 3,042,801
APPARATUS FOR ANALYZING A SAMPLE OF MATERIAL
Filed Dec. 30, 1959 3 Sheets-Sheet 1
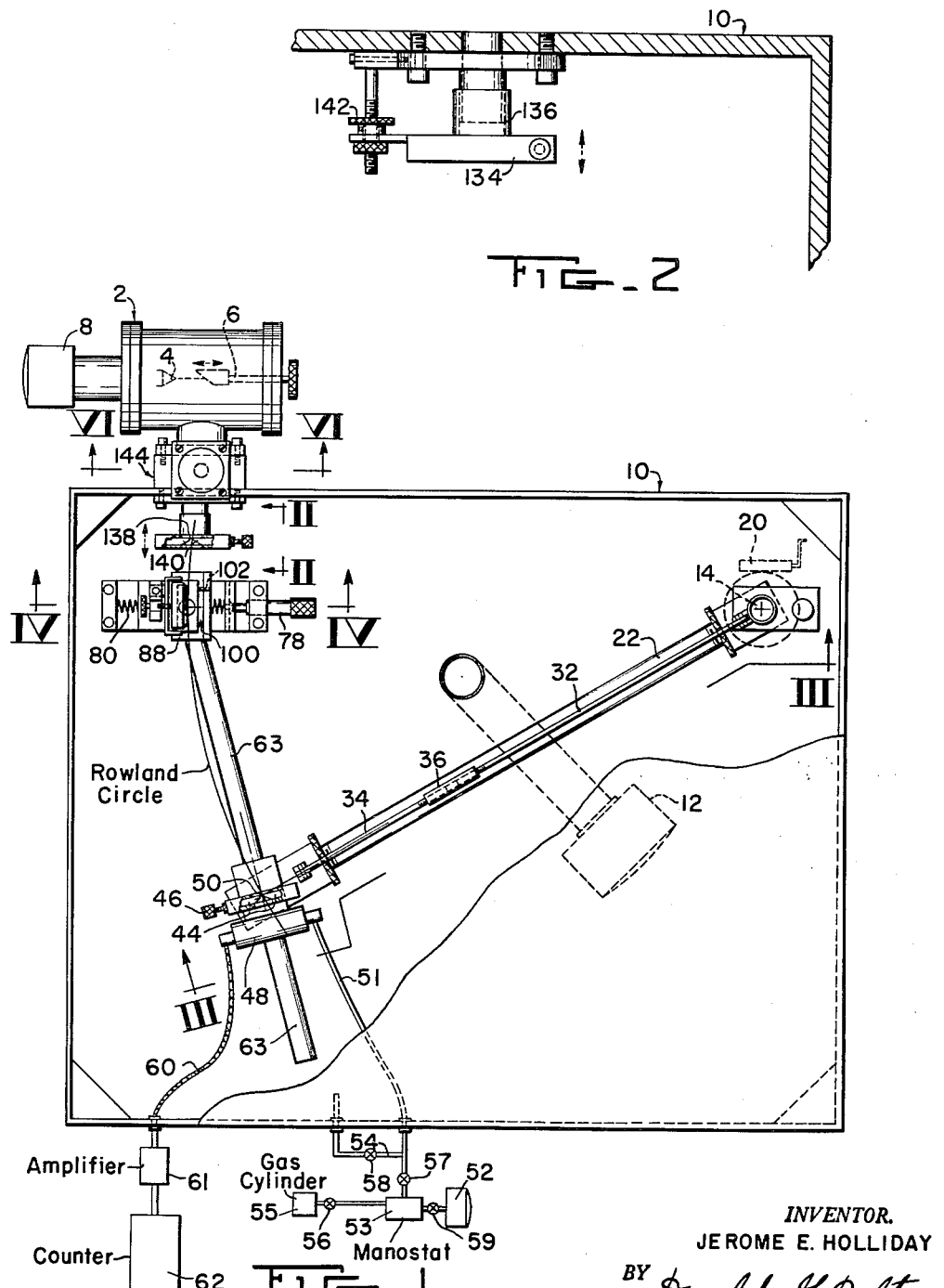
INVENTOR.
JEROME E. HOLLIDAY
BY Donald G. Dalton
ATTORNEY July 3, 1962  J. E. HOLLIDAY  3,042,801
APPARATUS FOR ANALYZING A SAMPLE OF MATERIAL
Filed Dec. 30, 1959  3 Sheets-Sheet 2

INVENTOR.
JEROME E. HOLLIDAY
BY Donald G. Dalton
ATTORNEY

INVENTOR.
JEROME E. HOLLIDAY
BY Donald G. Dalton
ATTORNEY 3,042,801
APPARATUS FOR ANALYZING A SAMPLE OF MATERIAL
Jerome E. Holliday, Delmont, Pa., assignor to United States Steel Corporation, a corporation of New Jersey
Filed Dec. 30, 1959, Ser. No. 862,844
5 Claims. (Cl. 250—51.5)

This invention relates to apparatus for analyzing a sample of material and more particularly to an X-ray spectrometer capable of detecting soft X-rays having wave lengths of between 30 angstroms and 200 angstroms. The apparatus includes two containers which must be evacuated with one of the containers having the X-ray source therein and the other containing the spectrometer. When a sample is replaced by a new sample its container loses its vacuum and unless a valve is provided between the two containers the vacuum will also be lost from the other container. When a valve is provided between the containers the distance between the sample and the grating is increased. With instruments in present use this distance is increased to such an extent that there is a resultant decrease in accuracy of the instrument.

It is therefore an object of my invention to provide apparatus for analyzing a sample of material in which the distance between the target and the grating is kept small.

Another object is to provide such apparatus in which accurate means are provided for positioning and maintaining the slits and the grating on the Rowland circle.

Still another object is to provide a valve which permits the distance between the target and the grating to be kept small and at the same time provides a good seal between the two containers of the apparatus.

These and other objects will be more apparent after referring to the following specification and attached drawings, in which:

FIGURE 1 is a horizontal plan view of the apparatus of my invention;

FIGURE 2 is a view on a larger scale taken on the line II—II of FIGURE 1;

Figure 4:
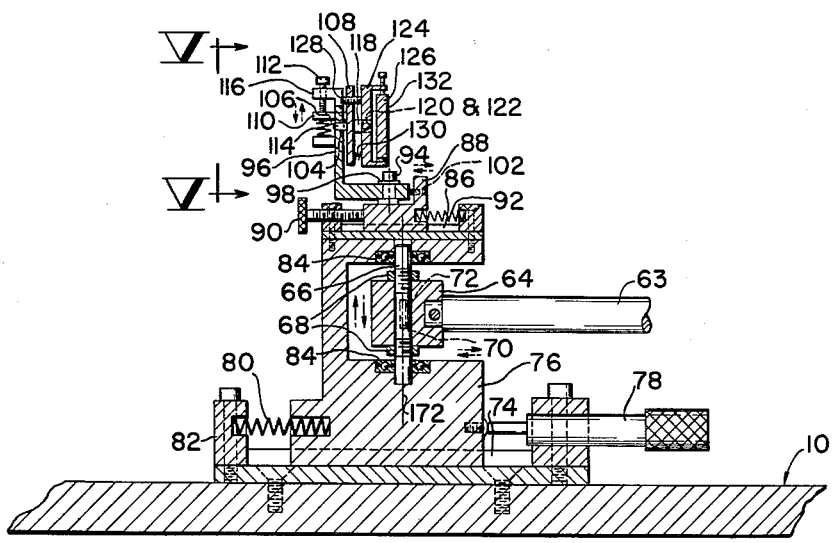
FIGURE 4 is a view on a larger scale taken on the line IV—IV of FIGURE 1.
Figure 3:
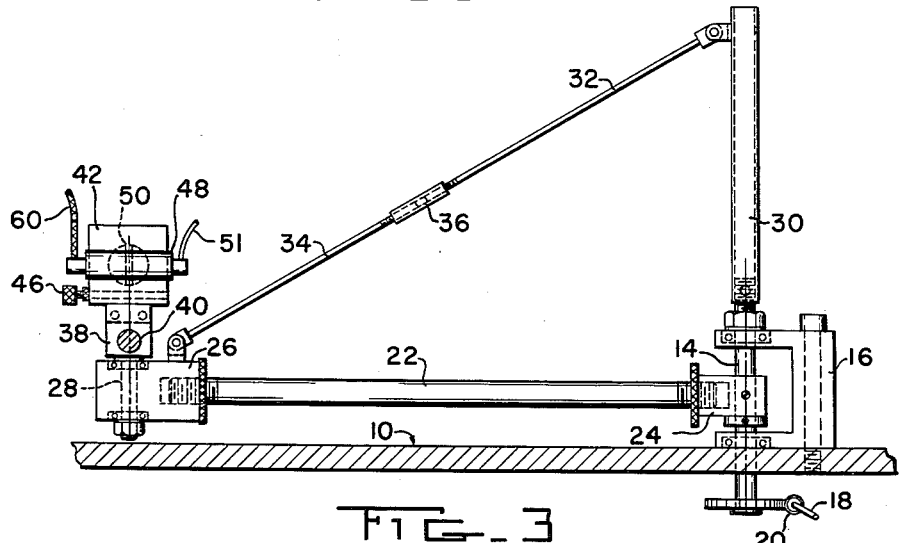
FIGURE 3 is a view taken on the line III—III of FIGURE 1.
Figure 5:
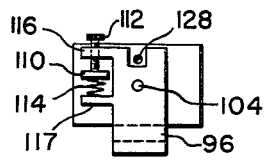
FIGURE 5 is a view taken on the line V—V of FIGURE 4.
Figure 6:
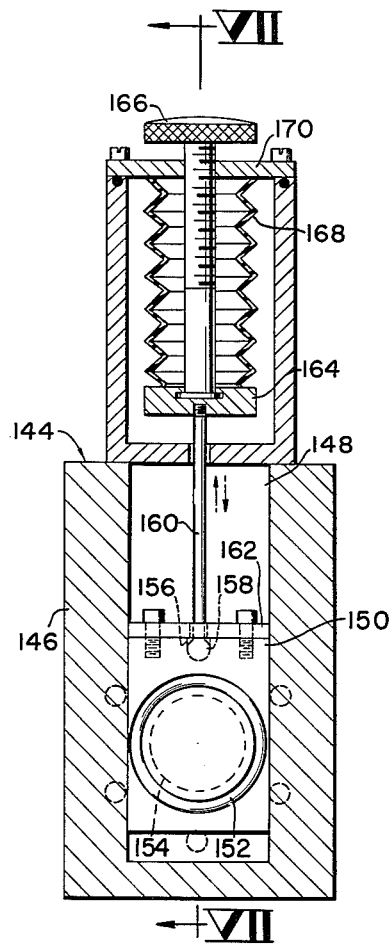
FIGURE 6 is a view on a larger scale taken on the line VI—VI of FIGURE 1.
Figure 7:
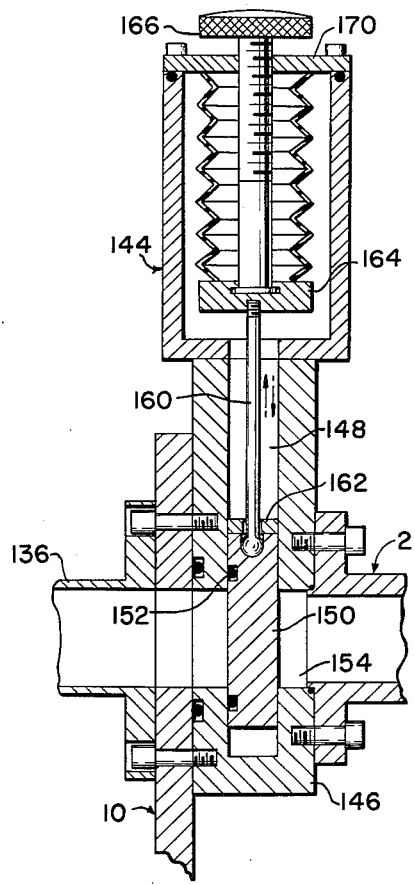
FIGURE 7 is a view taken on the line VII—VII of FIGURE 6.
Figure 8:
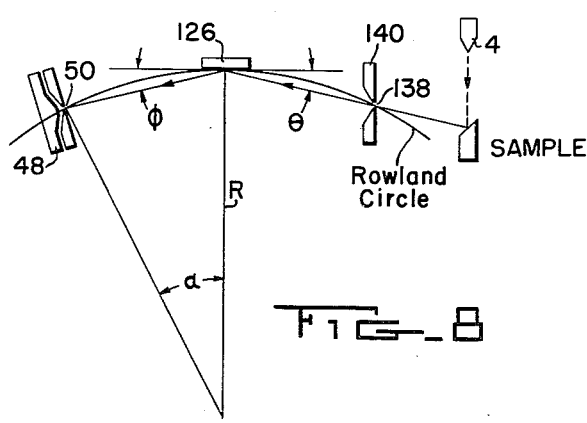
FIGURE 8 is a schematic view showing the relative positions of parts of the apparatus of my invention.

Referring more particularly to the drawings the reference numeral 2 indicates a container for an electron source 4 and a support 6 for a sample to be analyzed. The support 6 is preferably adjustably mounted as shown. A pump 8 is attached to the container 2 for evacuating air therefrom. A second container 10 is mounted adjacent the first container 2 and is preferably mounted horizontally in the same plane as container 2. A pump 12 is attached to the container 10 for evacuating air therefrom. The container 10 is provided with sufficient bracing to maintain it rigid when the air is evacuated therefrom. A vertical shaft 14 is mounted within the container 10 on a bracket 16. The lower end of the shaft 14 extends below the container 10. Means, including a handle 18 and gearing 20, is provided for turning the shaft 14. A horizontal arm 22 has one end mounted on the shaft 14 by means of a threaded bracket 24. A threaded bracket 26 is mounted on the opposite end of the arm 22. A second vertical shaft 28 is mounted for rotation in the bracket 26. The distance between the axes of shafts 14 and 28 may be varied by means of the threaded connections between the arm 22 and brackets 24 and 26. The shaft 14 extends upwardly above the top of bracket 16 and has a threaded end for supporting a vertical tube 30. A pair of rods 32 and 34 connected by a turnbuckle 36 extend between and are pivotally supported by the tube 30 and bracket 26. The purpose of the rods 32 and 34 and turnbuckle 36 is to prevent sagging of the end of the arm 22 carrying the bracket 26. The top of the shaft 28 terminates in a box-like portion 38 having a horizontal hole 40 therethrough. A block 42 is mounted on top of the portion 38 and has an opening therein for receiving knife edges 44 which may be moved toward and away from one another by means of screw 46. A proportional counter 48 is mounted on portion 38 in any suitable manner directly behind vertical slit 50 formed by the knife edges 44. A conduit 51 connects the proportional counter 48 to a vacuum pump 52 through a Manostat 53. A branch conduit 54 leads from conduit 51 to the interior of container 10. Manostat 53 is connected to a gas cylinder 55 through a valve 56. Valves 57, 58 and 59 control flow between pump 52, Manostat 53 and the inside of container 10. The conduit 51 may be connected to the inside of the container 10 through valve 58 and conduit 54 or to the gas source 55 to fill the counter. Leads 60 from the proportional counter 48 pass through the wall of the container 10 to an amplifier 61 connected to a counter 62. A second arm 63 is slidably mounted in the hole 40. The end of the arm 63 remote from shaft 28 is pinned into or otherwise connected to a block 64. A shaft 66 passes vertically through an opening in the block 64 and is threaded intermediate its ends for receiving nuts 68. A vertical slot 70 is provided in the shaft 66 for receiving a set screw 72 threaded into the block 64. A dovetail 74 is fastened to the base of container 10 and a slide 76 is mounted in the dovetail 74 for movement toward and away from the axis of shaft 14. A micrometer 78 supported by the dovetail 74 bears against that end of the slide 76 facing the shaft 14. A spring 80, having one end bearing against a bracket 82 attached to the dovetail 74 and its other end bearing against the slide 76, urges the slide 76 against the end of the micrometer 78. The slide 76 has an opening therein for receiving the arm 63, block 64 and shaft 66, bearings 84 being provided in the block 64 for shaft 66. By loosening nuts 68 the block 64 may be moved vertically until the end of arm 63 attached thereto is at the same elevation as the other end of arm 63. The nuts 68 are then tightened to hold the arm 63 in adjusted position. A dovetail 86 is provided on the top of slide 76 for receiving a bracket 88 which can be moved toward and away from the shaft 14 by means of a screw 90 which bears against the pressure of a spring 92. A vertical pin 94 is attached to the bracket 88. A grating holder 96 fits over the pin 94 and is held from vertical movement by means of a snap ring washer 98. A spring 100 (FIGURE 1) bears against one side of the holder 96 and against the bracket 88 and a screw 102 bears against the opposite side of the holder 96 and is threaded into the bracket 88 so that the holder 96 may be moved about the vertical axis of pin 94. The holder 96 has a horizontal hole 104 therein for receiving a pin 106 attached to a flanged member 108 having a horizontal flange 110 against which bears a screw 112 and a spring 114, which are supported by spaced horizontal flanges 116 and 117 forming part of holder 96. Thus, by adjusting screw 112 the member 108 is rotated about the horizontal axis of pin 106 which is perpendicular to and in the same vertical plane as the axis of pin 94. A flange 118 extends outwardly from member 108 on the side opposite flange 110 and has a horizontal opening 120 therein for receiving a pin 122 attached to U-shaped member 124 which receives grating 126. A screw 128 passing through member 108 bears against member 124 and a spring 130 extends between and bears against members 108 and 124. Thus, by adjusting the screw 128 the member 124 can be rotated about the axis of pin 122. The grating 126 is a conventional grating having a spherical concave surface 132 with vertical rulings, preferred density of which is 600 per mm. A slit holder 134, similar to holder 42, is attached to the wall of container 10 by a telescoping connection 136 consisting of two tubes, one connected to holder 134 and the other connected to the wall of container 10. A vertical slit 138 is provided between two knife edges 140 slidably mounted in holder 134. The position of the slit 138 may be adjusted horizontally. The holder 134 is movable toward and away from grating 126 by means of screw and nut connection 142. The containers 2 and 10 are connected by a valve 144 which is connected to the containers 2 and 10. The valve 144 includes a body member 146 having a recess 148 therein for receiving a gate 150. The side of the gate adjacent container 10 is provided with a resilient O-ring 152 which bears against the body 146 when the valve is closed. Opening 154 is provided through the valve body 146 transversely of the recess 148. The gate 150 has a semi-spherical opening 156 therein for receiving ball end 158 of a rod 160. A plate 162 holds the rod 160 in the opening 156. The other end of rod 160 is threaded into a plate 164 to the other side of which is attached a threaded stem 166. A flexible seal in the form of a bellows 168 bears against the plate 164 and a threaded plate 170 which receives the stem 166. By turning the stem 166 the gate 150 can be moved between closed and open position.

When it is desired to change the sample being analyzed the valve 144 is closed and air or other gas is admitted to the container 2. The pressure of this air or gas against the gate 150 being greater than the pressure in the container 10 will force the gate 150 toward the container 10 so as to give a very good seal between the ring 152 and the adjoining surface of body 146. Thus I have provided a simple valve which is easy to operate and which provides a good seal preventing loss of the vacuum from container 10. The design is such that the separation between the containers 2 and 10 is very small. For example, in one specific installation the distance is only 1¼". This enables the distance between the target and the grating to be kept small. Suitable seals are provided where shafts, tubes, etc., pass through the walls of the containers 2 and 10.

In setting up the apparatus the target or the sample of material to be analyzed is placed on the holder 6 and the grating 122 is placed in the holder 96. The slide 76 is adjusted so that the distance between the axis of shaft 14 and the axis of shaft 66 is ½ the radius of curvature of the spherical surface of grating 126. With the arm 63 removed from the hole 40 the arm 63 and shaft 66 are rotated until the center line of arm 62 is in alignment with a mark 172 on the slide 76. In this position the center line of arm 63 will be perpendicular to the vertical plane passing through the axes of shafts 14 and 66. A telescope is then set up and a sight taken on the block 64 in alignment with the axes of shafts 66 and 14. With the telescope so set up the slide 76 and associated parts are removed. Before removing the slide 76 the reading on micrometer 78 is recorded so that the slide 76 can be returned to its adjusted position. The arm 22 is then rotated about the axis of shaft 14 until the knife edges 44 are in the sight of the set-up telescope. An angle measurement on gearing 20 is set at zero with the shaft 14 and arm 22 in this position. The angle alpha is read on an index (not shown) on gearing 20 and angle phi is equal to one half of alpha. The distance between center lines of shafts 14 and 28 is then adjusted to ½ the radius of curvature of the spherical surface of grating 126 and the length of rods 32 and 34 and turnbuckle 36 are adjusted so that the axis of shaft 28 is vertical. Angle alpha is then recorded and the arm 22 is moved until slit 50 is in the position of slit 138. The position of slit 138 is determined by the glancing angle theta. This angle should be kept as small as possible and is preferably between 3 and 6°. A second telescope is positioned on the knife edge 44 and a third telescope is centered on the aperture of slit 50. The second and third telescopes are left in position and the arm 22 moved back to its original position. The slide 76 and associated parts are then replaced in their adjusted position. The cross hairs of a fourth telescope are then lined up with the center of slit 50 and the vertical lines of the grating 126 are aligned with the cross hairs of the fourth telescope by means of the adjusting screw 112. Grating 126 is then moved within the member 124 by hand until the vertical center of the lines thereon is in the vertical plane through the axis of shafts 14 and 66. The edges of grating 126 are then made perpendicular to the plane through the axes of shafts 14 and 66 by means of adjusting screw 102. The bracket 88 is then moved by screw 90 until the horizontal distance from the axis of shaft 14 and the bottom of the concave surface 132 is equal to ½ the radius of curvature of said surface. The knife edge 140 is lined up with the second telescope and the center line of slit 138 is aligned with the third telescope. Slit 138 is then in its proper position.

In operation, valve 57 is closed and valve 58 opened so that the counter 48 is connected to the interior of containers 10. The containers 2 and 10 and counter 48 are then evacuated by means of pumps 8 and 12. After evacuation the valve 58 is closed and the valve 57 opened so that the pump 52 is connected to the monostat 53 and gas cylinder 55. The pressure in the counter 48 at this time is about eight centimeters. Target 6 is then moved in a horizontal plane to obtain maximum intensity and to obtain a straight line between the sample, the slit 138 and the pole of grating 126. When electron source 4 is energized X-rays are emitted from the sample or target and readings are taken on counter 62 as the counter 48 is scanned by rotation of shaft 14 with slit 50 and counter 48 moving along arm 63 on the Rowland circle.

While several embodiments of my invention have been shown and described, it will be apparent that other adaptations and modifications may be made without departing from the scope of the following claims.

I claim:

1. Apparatus for analyzing a sample of material comprising a first container containing an X-ray source and means for supporting said sample, means for evacuating air from said first container, a second container adjacent said first container, means for evacuating air from said second container, a connection between said containers, a grating within said second container, said grating having a spherical concave surface, a shaft in said second container spaced from said grating on the side thereof having the spherical concave surface, the distance between the axis of said shaft and the pole of said grating being one-half the radius of said spherical concave surface, said shaft passing through a wall of said second container, means for turning said shaft, a first arm attached to said shaft for movement therewith, a proportional counter mounted on the end of said first arm remote from said shaft, means mounting a slit on the said remote end of said first arm, said slit being on a straight line between said proportional counter and the pole of said grating, said mounting means having a hole therethrough, a second arm slidably mounted in said hole, a second mounting means attached to the end of said second arm remote from said first mounting means, said second mounting means including a slide movable toward and away from said shaft, means for adjustably mounting said grating on said slide, and means mounting a second slit on said second container in a straight line between said sample mounting means and the pole of said grating.

2. Apparatus for analyzing a sample of material comprising a first container containing an X-ray source and means for supporting said sample, means for evacuating air from said first container, a second container adjacent said first container, means for evacuating air from said second container, a connection between said containers including a valve, a grating within said second container, said grating having a spherical concave surface, a shaft in said second container spaced from said grating on the side thereof having the spherical concave surface, the distance between the axis of said shaft and the pole of said grating being one-half the radius of said spherical concave surface, said shaft passing through a wall of said second container, means on the outside of said second container for turning said shaft, a first arm attached to said shaft for movement therewith, a proportional counter mounted on the end of said first arm remote from said shaft, means mounting a slit on the said remote end of said first arm, said slit being on a straight line between said proportional counter and the pole of said grating, said mounting means having a hole therethrough, a second arm slidably mounted in said hole, a second mounting means attached to the end of said second arm remote from said first mounting means, said second mounting means including a slide movable toward and away from said shaft, means on said slide mounting said grating for movement about an axis parallel to the axis of said shaft, for tilting movement toward and away from said shaft and for tilting movement transversely to said last named movement, and means mounting a second slit on said second container in a straight line between said sample mounting means and the pole of said grating.

3. Apparatus for analyzing a sample of material comprising a first container containing an X-ray source and means for supporting said sample, means for evacuating air from said first container, a second container adjacent said first container, means for evacuating air from said second container, a connection between said containers including a valve, said valve including a body member having an opening therethrough for connecting the containers and a recess therein arranged transversely of said opening, a gate slidably mounted in said recess, a resilient ring mounted on the side of said gate adjacent the container having the lower pressure, said ring surrounding said opening when the valve is closed, and means for moving said gate between open and closed positions, a grating within said second container, said grating having a spherical concave surface, a shaft in said second container spaced from said grating on the side thereof having the spherical concave surface, the distance between the axis of said shaft and the pole of said grating being one-half the radius of said spherical concave surface, said shaft passing through a wall of said second container, means on the outside of said second container for turning said shaft, a first arm attached to said shaft for movement therewith, a proportional counter mounted on the end of said first arm remote from said shaft, means mounting a slit on the said remote end of said first arm, said slit being on a straight line between said proportional counter and the pole of said grating, said mounting means having a hole therethrough, a second arm slidably mounted in said hole, a second mounting means attached to the end of said second arm remote from said first mounting means, said second mounting means including a slide movable toward and away from said shaft, means on said slide mounting said grating for movement about an axis parallel to the axis of said shaft, for tilting movement toward and away from said shaft and for tilting movement transversely to said last named movement, and means mounting a second slit on said second container in a straight line between said sample mounting means and the pole of said grating.

4. Apparatus for analyzing a sample of material comprising a first container containing an X-ray source and means for supporting said sample, means for evacuating air from said first container, a second container adjacent said first container having a generally horizontal base, means for evacuating air from said second container, a connection between said containers including a valve, a grating within said second container, said grating having a spherical concave surface, a vertical shaft in said second container spaced from said grating on the side thereof having the spherical concave surface, the distance between the axis of said shaft and the pole of said grating being one-half the radius of said spherical concave surface, said shaft passing through a wall of said second container, means on the outside of said second container for turning said shaft, a first horizontal arm attached to said shaft for movement therewith, a proportional counter mounted on the end of said first arm remote from said shaft, means mounting a slit on the said remote end of said first arm, said slit being on a straight line between said proportional counter and the pole of said grating, a generally vertical member attached to one end of said arm, a diagonal member attached to and extending between the top of said generally vertical member and the other end of said arm, said mounting means having a horizontal hole therethrough, a second horizontal arm slidably mounted in said hole, a second mounting means attached to the end of said second arm remote from said first mounting means, said second mounting means including a slide mounted on said base for horizontal movement toward and away from said shaft, means for adjustably mounting said grating on said slide, and means mounting a second slit on said second container in a straight line between said sample mounting means and the pole of said grating.

5. Apparatus for analyzing a sample of material comprising a first container containing an X-ray source and means for supporting said sample, means for evacuating air from said first container, a second container adjacent said first container having a generally horizontal base, means for evacuating air from said second container, a connection between said containers including a valve, a grating within said second container, said grating having a spherical concave surface, a vertical shaft in said second container spaced from said grating on the side thereof having the spherical concave surface, the distance between the axis of said shaft and the pole of said grating being one-half the radius of said spherical concave surface, said shaft passing through a wall of said second container, means on the outside of said second container for turning said shaft, a first horizontal arm attached to said shaft for movement therewith, a proportional counter mounted on the end of said first arm remote from said shaft, means mounting a slit on the said remote end of said first arm, said slit being on a straight line between said proportional counter and the pole of said grating, a generally vertical member attached to one end of said arm, a diagonal member attached to and extending between the top of said generally vertical member and the other end of said arm, said mounting means having a horizontal hole therethrough, a second horizontal arm slidably mounted in said hole, a second mounting means attached to the end of said second arm remote from said first mounting means, said second mounting means including a slide mounted on said base for horizontal movement toward and away from said shaft, means on said slide mounting said grating for movement about an axis parallel to the axis of said shaft, for tilting movement toward and away from said shaft and for tilting movement transversely to said last named movement, and means mounting a second slit on said second container in a straight line between said sample mounting means and the pole of said grating.

References Cited in the file of this patent

UNITED STATES PATENTS

| | | |
|---|---|---|
| 2,333,455 | Warren | Nov. 2, 1943 |
| 2,652,223 | Peters | Sept. 15, 1953 |
| 2,908,821 | Schumacher | Oct. 13, 1959 |
| 2,924,715 | Hendee et al. | Feb. 9, 1960 |